US009669460B2

(12) United States Patent
Naito et al.

(10) Patent No.: US 9,669,460 B2
(45) **Date of Patent: *Jun. 6, 2017**

(54) METHOD FOR PRODUCING FINE TUNGSTEN POWDER

(75) Inventors: Kazumi Naito, Tokyo (JP); Shoji Yabe, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 194 days.

This patent is subject to a terminal disclaimer.

(21) Appl. No.: 14/357,953

(22) PCT Filed: Aug. 29, 2012

(86) PCT No.: PCT/JP2012/071760

§ 371 (c)(1), (2), (4) Date: May 13, 2014

(87) PCT Pub. No.: WO2013/073253

PCT Pub. Date: May 23, 2013

(65) Prior Publication Data

US 2014/0315039 A1 Oct. 23, 2014

(30) Foreign Application Priority Data

Nov. 15, 2011 (JP) ................................ 2011-250155

(51) Int. Cl.

| | |
|---|---|
| ***B22F 1/00*** | (2006.01) |
| ***B22F 9/04*** | (2006.01) |
| ***H01G 9/052*** | (2006.01) |
| ***B82Y 30/00*** | (2011.01) |

(52) U.S. Cl.

CPC .......... *B22F 1/0088* (2013.01); *B22F 1/0011* (2013.01); *B22F 1/0018* (2013.01); *B22F 9/04* (2013.01); *B82Y 30/00* (2013.01); *H01G 9/0525* (2013.01); *B22F 2998/10* (2013.01); *Y10T 428/12181* (2015.01)

(58) Field of Classification Search

None

See application file for complete search history.

(56) References Cited

U.S. PATENT DOCUMENTS

| | | | |
|---|---|---|---|
| 3,236,634 A | 2/1966 | Lambdin et al. | |
| 6,193,779 B1 | 2/2001 | Reichert et al. | |
| 6,876,083 B2 | 4/2005 | Yano et al. | |
| 7,154,743 B2 | 12/2006 | Takatani et al. | |
| 2007/0190797 A1* | 8/2007 | Wu .................... | H01L 21/7684 438/745 |

FOREIGN PATENT DOCUMENTS

| | | |
|---|---|---|
| CN | 101983804 A | 3/2011 |
| EP | 2055412 A2 | 5/2009 |
| JP | 52-011752 A | 1/1977 |
| JP | 2003-272959 A | 9/2003 |
| JP | 2004-349658 A | 12/2004 |
| JP | 2005-325448 A | 11/2005 |
| JP | 2006-299385 A | 11/2006 |
| WO | 2004/055843 A1 | 7/2004 |
| WO | 2005/099936 A1 | 10/2005 |
| WO | 2012/086272 A1 | 6/2012 |

OTHER PUBLICATIONS

Zhou et al. (Materials Science and Engineering A, 2009, vol. 505, p. 131-135).*

Machine translation of CN 101983804A. Mar. 2011.*

Han Yu-xian et al., Synthesis of Tungsten Nano-particles Prepared by $H_2O_2$ Oxidation Hydrothermal Crystallization Method, 2008, No. 4, pp. 37-40.

Liao Jiqiao et al., "Particle size characterization of ultrafine tungsten powder", Elsevier, International Journal of Refractory Metals & Hard Material, vol. 19, (2001), pp. 89-99, XP004381989.

Yong Han et al., "The effects of ball-milling treatment on the densification behavior of ultra-fine tungsten powder", Elsevier, International Journal of Refractory Metals and Hard Materials, vol. 29, No. 6, (2011), pp. 743-750, XP028252659.

Communication dated Nov. 24, 2015, from the European Patent Office in counterpart European Application No. 12849043.0.

International Search Report of PCT/JP2012/071760 dated Sep. 25, 2012.

* cited by examiner

*Primary Examiner* — Jie Yang
*Assistant Examiner* — Xiaowei Su
(74) *Attorney, Agent, or Firm* — Sughrue Mion, PLLC

(57) ABSTRACT

A method for finely powdering tungsten powder, which includes dispersing tungsten powder in an aqueous solution containing an oxidizing agent to form an oxide film in the surface of the tungsten powder and removing the oxide film with an alkaline aqueous solution. Also disclosed is a method for producing fine tungsten powder, which includes obtaining tungsten powder having an average particle size of 0.05 to 0.5 μm by a process including the above method for finely powdering. Also disclosed is a tungsten powder having an average particle size of 0.05 to 0.5 μm, in which the dMS value (product of an average particle size d (μm), true density M ($g/cm^3$) and BET specific surface area S ($m^2/g$)) is within the range of 6±0.8.

6 Claims, No Drawings

METHOD FOR PRODUCING FINE TUNGSTEN POWDER

CROSS REFERENCE TO RELATED APPLICATIONS

This is a National Stage of International Application No. PCT/JP2012/071760 filed Aug. 29, 2012, claiming priority based on Japanese Patent Application No. 2011-250155 filed Nov. 15, 2011, the contents of all of which are incorporated herein by reference in their entirety.

TECHNICAL FIELD

The present invention relates to a method for producing fine tungsten powder. Specifically, the present invention relates to a method for processing a tungsten powder into the one having a smaller particle size which is useful for use in an electrolytic capacitor; and a method for producing fine tungsten powder.

BACKGROUND ART

With the progress of small-size, high-speed and light-weight electronic devices such as cellular phones and personal computers, the capacitor used for these electronic devices is demanded to have a smaller size, a larger capacitance and a lower ESR (Equivalent Series Resistance).

As an example of such a capacitor, the electrolytic capacitor has been proposed, which capacitor is produced by anodically oxidizing an anode body for capacitors comprising a sintered body made of a valve-acting metal powder which can be anodized such as tantalum to form a dielectric layer made of the oxide of the metal on the surface of the anode body.

The electrolytic capacitor using tungsten as a valve-acting metal and employing the sintered body of the tungsten powder as an anode body can attain a larger capacitance compared to the electrolytic capacitor obtained with the same formation voltage by employing the anode body of the same volume using the tantalum powder having the same particle diameter. However, the electrolytic capacitor having the sintered body of the tungsten powder has been unpracticed as an electrolytic capacitor due to the large leakage current (LC). In order to solve this issue, a capacitor using the alloy of tungsten and other metals has been studied and has achieved some improvement in the leakage current, but it was not enough (JP-A-2004-349658 (U.S. Pat. No. 6,876,083 B2); Patent Document 1).

Patent Document 2 (JP-A-2003-272959) discloses a capacitor using an electrode of a tungsten foil having formed thereon a dielectric layer selected from $WO_3$, $W_2N$ and $WN_2$, but the capacitor is not to solve the above-mentioned leakage current problem.

Also, Patent Document 3 (WO 2004/055843 publication (U.S. Pat. No. 7,154,743 B2)) discloses an electrolytic capacitor using an anode body selected from tantalum, niobium, titanium and tungsten, but it does not describe a specific example using tungsten in the specification.

In an anode body for an electrolytic capacitor which is obtained by molding tungsten powder and sintering it, generally the smaller particle size enables the production of an anode body having a larger capacitance, if the volume of the anode body is the same. Therefore the smaller size of the raw material tungsten powder is more preferable, but the average particle size of a commercially-available tungsten powder is about 0.5 to 20 μm.

Tungsten powder can be manufactured by treating oxide, halide or ammonium salt of tungsten as a raw material with a reducing agent such as hydrogen. However, increase in the rate of reduction may give rise to a problem of generating a composite oxide and the like. Therefore, it is necessary to decrease the rate of reduction in order to produce finer powder, and it leads to low production efficiency and high cost. Also, it is necessary to produce the fine powder by a complicated process equipped with an expensive controlling device. Furthermore, there has been a problem of handling a material having a wide explosibility range such as hydrogen gas.

PRIOR ART

Patent Document

Patent Document 1: JP-A-2004-349658
Patent Document 2: JP-A-2003-272959
Patent Document 3: WO 2004/055843

DISCLOSURE OF THE INVENTION

Problems to be Solved by the Invention

An object of the present invention is to provide a method for processing tungsten powder to obtain tungsten powder having a smaller particle size as a material of a capacitor comprising tungsten as an anode body (hereinafter referred to as a tungsten capacitor), and a method for producing fine tungsten powder using the method.

Means to Solve the Problem

As a result of intensive study to solve the above-mentioned problem, the present inventors have found that a fine tungsten powder which is more suitable for a capacitor can be obtained by chemically oxidizing the surface of a tungsten powder which is currently available and have accomplished the present invention.

That is, the present invention relates to a method for finely powdering tungsten powder and a method for producing fine tungsten powder as below.

[1] A method for finely powdering tungsten powder, comprising dispersing tungsten powder in an aqueous solution containing an oxidizing agent to form an oxide film in the surface of the tungsten powder and removing the oxide film with an alkaline aqueous solution.

[2] The method for finely powdering tungsten powder as described in [1] above, wherein the removal of the oxide film with an alkaline aqueous solution includes mechanically removing the reaction product in the particle surface of the tungsten powder.

[3] The method for finely powdering tungsten powder as described in [1] or [2] above, wherein the oxidizing agent is selected from manganese(VII) compounds, chrome(VI) compounds, halogen acid compounds, peroxoacid compounds and salts thereof, and peroxides.

[4] The method for finely powdering tungsten powder as described in [3] above, wherein the oxidizing agent is hydrogen peroxide or ammonium persulfate.

[5] A method for producing fine tungsten powder, comprising obtaining tungsten powder having an average particle size of 0.05 to 0.5 μm by a process including the method described in any one of [1] to [4] above.

[6] A method for producing fine tungsten powder, comprising obtaining tungsten powder, in which the dMS value (product of an average particle size d (μm), true density M ($g/cm^3$) and BET specific surface area S ($m^2/g$)) is within the range of 6±0.8, by a process including the method described in any one of [1] to [4] above.

[7] A tungsten powder having an average particle size of 0.05 to 0.5 μm, in which the dMS value (product of an average particle size d (μm), true density M ($g/cm^3$) and BET specific surface area S ($m^2/g$)) is within the range of 6±0.8.

Effects of the Invention

According to the present invention, using a currently available tungsten powder or a tungsten powder which can be produced by a known method as a raw material, a tungsten powder having a particle size smaller than that of the raw material powder can be produced. Also, the particles of the tungsten powder obtained by the present invention have a more spherical shape compared to the particles of the raw material tungsten powder.

Since the tungsten powder obtained by the present invention have a smaller particle size, a capacitor obtained thereof has a larger capacitance. Also, the tungsten powder has a higher flowability due to the more spherical particle shape. Accordingly, the powder can be handled more easily in the process of producing granulate powder and the like to be described below.

MODE FOR CARRYING OUT THE INVENTION

Raw Material Tungsten Powder

The average particle size of the raw material tungsten powder to be finely powdered in the present invention is preferably within the range of 0.1 to 10 μm.

A raw material tungsten powder can be obtained by, in addition to using a commercially-available product, manufacturing by a known method. For example, it can be obtained by manufacturing by appropriately selecting from a method of crushing tungsten trioxide powder under hydrogen atmosphere; a method of reducing tungsten acid or tungsten halide with hydrogen or sodium and the like. Also, a tungsten powder may be obtained reducing the tungsten-containing mineral directly or through several steps and by selecting reducing conditions.

However, since it is difficult to obtain a raw material tungsten powder having a small particle size by these methods, a fine particle tungsten powder obtained according to the method of the present invention may be used as a raw material tungsten powder. In this case, a tungsten powder having an even smaller particle size can be obtained. Thus, a tungsten powder having an average particle size of, for example, 0.05 μm or less can be obtained by repeating applying the method of the present invention.

However, in the case of forming a dielectric layer by anode oxidation, there is a lower limit of the particle size of the powder which can be suitably used for a capacitor. The lower limit of the particle size of the tungsten powder used for a capacitor is twice or more the thickness of the dielectric layer to be formed. For example, when the rated voltage is 2 V, the particle size is to be 0.05 μm or more. If the particle size is smaller than the value as defined above, a conductive portion of the tungsten is not left sufficiently when performing anodic oxidation and it becomes difficult to construct an anode of an electrolytic capacitor.

Specifically, when used for a high capacitance capacitor, the particle size of the tungsten powder is preferably 0.05 to 0.5 μm, more preferably 0.1 to 0.4 μm.

The raw material tungsten powder used in the method of the present invention may contain impurities within a range which does not affect the capacitor properties or may be processed to contain impurities in order to improve the capacitor properties. However, it is preferable that the particle surface treatment such as silicidation, nitridation, carbonization or boronization to be described later is conducted in a process later than applying the present invention.

[Fine Powdering of Tungsten Powder]

In the present invention, a fine tungsten powder is produced by a processing method of chemically oxidizing the surface of particles constituting a raw material tungsten powder and removing the oxide film in the surface.

[Oxidation Method]

By dispersing the raw material tungsten powder in an aqueous solution of an oxidizing agent to be kept for a predetermined time, the powder surface is oxidized. It is desirable to use a device such as a homogenizer which is capable of vigorous stirring in order to keep good dispersion state and to speed up oxidation of the surface. Also, oxidation proceeds at a faster rate at a high temperature.

As an oxidizing agent, a compound containing oxygen is preferable to supply oxygen to tungsten. Examples include a manganese(VII) compound such as permanganate; a chromium(VI) compound such as chrome trioxide, chromate and dichromate; a halogen acid compound such as perchloric acid, chlorous acid, hypochlorous acid and salts thereof; peroxides such as hydrogen peroxide, diethyl peroxide, sodium peroxide and lithium peroxide; peroxoacid and salt thereof such as acetyl hydroperoxide and persulfate. Specifically, from the viewpoint of handleability, stability as an oxidizing agent, and high solubility in water, hydrogen peroxide and ammonium persulfate are preferable.

The concentration of the oxidizing agent in an aqueous solution is within a range from about 1% to the saturated solubility of the oxidizing agent. The concentration of the oxidizing agent can be appropriately determined by a preliminary experiment.

The time period for oxidation is one hour to 1,000 hours, preferably one hour to 100 hours. The oxidation temperature is from 20° C. to the boiling point of the solution, preferably from 50° C. to the boiling point of the solution.

As the solvent used in each process of the present invention, not only water but also a mixed aqueous solution with a water-soluble organic solvent (such as ethanol and methanol) can be employed considering dispersibility of the powder and time required for decantation.

After the oxidation reaction, the tungsten powder is separated from the oxidation reaction solution by an operation such as decantation, and washed by a series of operations of putting the powder into a solvent, stirring, allowing the solvent to stand, and decantation. The tungsten powder at this point underwent a change in color from black at the time of a material to yellowish blue, and the surface oxidation can be visually confirmed.

Removal of the Oxide Film:

The oxide film of the tungsten powder obtained as mentioned above, in which the surface is oxidized, is subjected to treatment with an alkaline aqueous solution and removed at least chemically. Preferably, using a device such as a homogenizer which is capable of vigorous stirring, the above-mentioned stirring is conducted while mechanically removing the product generated in the surface of tungsten particles as well.

As an alkaline aqueous solution, for example, sodium hydroxide aqueous solution, potassium hydroxide aqueous solution, ammonia water and the like can be used, and sodium hydroxide aqueous solution and potassium hydroxide aqueous solution are preferable.

Specifically, a tungsten powder in which the surface is oxidized is dispersed into an alkaline aqueous solution by stirring and the like. The solution is allowed to stand after the stirring. After removing the alkaline aqueous solution by decantation, a series of operations of putting a solvent such as water into the tungsten powder, stirring the resultant solution, allowing it to stand and subjecting it to decantation is repeated several times. By these operations, the oxide formed in the surface of tungsten particles is removed. Subsequently, the solution is dried in a vacuum dryer under reduced pressure (e.g. $10^4$ to $10^2$ Pa) at 50 to 180° C. and cooled to room temperature. Then, by gradually introducing air into the dryer so that ignition may not occur and taking out the powder into the air, a tungsten powder having a smaller particle size than that of the raw material tungsten powder can be obtained.

According to the method of the present invention, almost spherical tungsten particles can be obtained unless the raw material tungsten powder particles have a shape having especially high anisotropy. The fact that the particle shape is spherical can be confirmed by that the average particle diameter (d) (μm), true density (M) ($g/cm^3$) and BET specific surface area (S) ($m^2/g$) of the obtained tungsten powder satisfy the following formula.

$$d=6/(M\times S) \quad (1)$$

That is, it can be said that if the product (d×S×M; abbreviated as dSM) of the average particle diameter (d) (μm), true density (M) ($g/cm^3$) and BET specific surface area (S) ($m^2/g$) of the obtained tungsten powder is near to 6, the obtained tungsten powder particles have a almost-spherical shape. The dMS value of the tungsten powder obtained by the present invention is generally within the range of 6±0.8. Furthermore, by using the tungsten powder obtained by applying the method of the present invention as a raw material powder, it is also possible to obtain a tungsten powder composed of particles with higher sphericity.

Since the dielectric layer formed in the surface of an almost-sphere particle has a substantially constant curvature and has no highly-curved portion with a small curvature in which stress tends to be concentrated, it undergoes little degradation. As a result, a capacitor having better LC characteristics can be obtained.

The tungsten powder produced by the method of the present invention may be directly sintered to be made into a sintered body, or may be granulated into granules about the size of 10 to 300 μm to be sintered and made into a sintered body. The granulated tungsten powder is easier to handle and to keep the ESR as low as possible.

Furthermore, the tungsten powder produced by the method of the present invention may be subjected to silicidation, nitridation, carbonization or boronization treatment to be made into a tungsten powder containing at least one of tungsten silicide, tungsten nitride, tungsten carbide and tungsten boride in a part of the surface of the tungsten particles. These treatments may be conducted when the tungsten powder has become a granulated powder or a sintered body. An electrolytic capacitor is fabricated comprising the sintered body as one electrode (anode), a counter electrode (cathode) and a dielectric body interposed therebetween.

EXAMPLES

The present invention is described below by referring to Examples and Comparative Examples, but the present invention is not limited thereto.

In the present invention, the particle diameter, specific surface area and true density were measured by the methods described below.

The particle diameter was measured by using HRA9320-X100 manufactured by Microtrac Inc. and the particle size distribution was measured by the laser diffraction scattering method. A particle diameter value ($D_{50}$; μm) corresponding to cumulative volume % of 50 volume % was designated as the average particle size (d). The diameter of the secondary particles is to be measured by this method. However, since the tungsten powder generally has good dispersibility, the measurement results near to the primary powder particle diameter can be obtained. Therefore, the measurement results can be substantially regarded as a primary particle diameter and applied to the above-described formula (1) to judge the particle shape.

The specific surface area (S; $m^2/g$) was measured by the BET method by using NOVA2000E (manufactured by SYSMEX Corp.).

The true density (M; $g/cm^3$) was measured by a picnometer method (20° C.)

Example 1

200 g of tungsten powder having an average particle diameter of 1 μm obtained by reducing ammonium tungstate with hydrogen was put in 500 ml of distilled water in which 5 mass % of ammonium persulfate was dissolved and stirred at 50° C. for 24 hours using homogenizer NS-51 manufactured by MICROTEC Co., Ltd. An amount of water lost through evaporation was successively added all the period. After allowing the liquid to stand at room temperature for 17 hours to sedimentate the powder, the liquid was removed by decantation. After adding another 200 ml of distilled water, the liquid was stirred by a homogenizer for five minutes and allowed to stand for five hours, and the liquid was removed by decantation. The series of operations of feeding distilled water, stirring, allowing the water to stand, and decantation was repeated four times. The tungsten powder at this point underwent a change in color from black to yellowish blue, which revealed that the surface of the tungsten powder was oxidized. Subsequently, 100 ml of a 5 mass % sodium hydroxide aqueous solution was added to the powder and stirred by a homogenizer for one hour. As described above, after allowing the liquid to stand and removing the liquid by decantation, the series of operations of feeding distilled water, stirring, allowing the liquid to stand, and decantation was repeated four times. The tungsten powder at this point was black and the oxide formed in the particle surface was removed. Subsequently, part of the powder was transferred to a vacuum dryer (about $10^3$ Pa, 50° C.). After drying, the powder was cooled to room temperature. Next, air was introduced gradually so that ignition may not occur and the powder was taken out into the air. The produced powder had an average particle diameter (d) of 0.5 μm, specific surface area (S) of 0.6 $m^2/g$ and true density (M) of 19.3 $g/cm^3$. The product of the average particle diameter, specific surface area and true density (dMS) of the obtained tungsten powder was 5.8. It was confirmed that the particles of the obtained powder were almost spherical because the dMS value was within the range of 6±0.2.

Example 2

A tungsten powder was obtained in a similar manner as in Example 1 except that 100 ml of ethanol and 400 ml of distilled water were used instead of 500 ml of distilled water first added to the powder in Example 1, the concentration of the dissolved ammonium persulfate was changed to 3 mass %, and the sedimentation time before decantation was changed to 24 hours. By adding ethanol to the first liquid, the dispersibility of the tungsten powder in the initial stage was improved and facilitated the surface oxidation. The produced powder had an average particle diameter (d) of 0.4 μm, specific surface area (S) of 0.7 $m^2/g$ and true density (M) of 19.3 $g/cm^3$. The product of the average particle diameter, specific surface area and true density of the obtained tungsten powder (dMS) was 5.4. It was confirmed that the particles of the obtained powder were almost spherical because the dMS value was within the range of 6±0.6.

The invention claimed is:

1. A method for reducing a particle size of tungsten powder, comprising dispersing the tungsten powder in an aqueous solution containing an oxidizing agent to form an oxide film in the surface of the tungsten powder and removing the oxide film with an alkaline aqueous solution, and which further comprises separating the tungsten powder from the aqueous solution containing the oxidizing agent after forming the oxide film in the surface of the tungsten powder and prior to removing the oxide film with the alkaline aqueous solution.

2. The method for reducing a particle size of tungsten powder as claimed in claim 1, wherein the removal of the oxide film with the alkaline aqueous solution includes mechanically removing the reaction product in the surface of the tungsten powder.

3. The method for reducing a particle size of tungsten powder as claimed in claim 1, wherein the oxidizing agent is selected from the group consisting of manganese VII compounds, chrome VI compounds, halogen acid compounds, peroxoacid compounds including salts thereof, and peroxides.

4. The method for reducing a particle size of tungsten powder as claimed in claim 3, wherein the oxidizing agent is hydrogen peroxide or ammonium persulfate.

5. A method for producing tungsten powder having an average particle size of 0.05 to 0.5 μm, which comprises dispersing tungsten powder in an aqueous solution containing an oxidizing agent to form an oxide film in the surface of the tungsten powder and removing the oxide film with an alkaline aqueous solution.

6. A method for producing tungsten powder having a d×M×S value which is the product of an average particle size d in units of μm, true density M in units of $g/cm^3$ and BET (Brunauer-EmmeH-Teller) specific surface area S in units of $m^2/g$ within a range of 6±0.8, which comprises dispersing tungsten powder in an aqueous solution containing an oxidizing agent to form an oxide film in the surface of the tungsten powder and removing the oxide film with an alkaline aqueous solution.

* * * * *